United States Patent
Flammang

[19]

[11] Patent Number: 5,880,407
[45] Date of Patent: Mar. 9, 1999

[54] APPARATUS FOR DISPENSING MATERIALS

[76] Inventor: John D. Flammang, 39670 Highview Dr., Oakhurst, Calif. 93644

[21] Appl. No.: 625,747

[22] Filed: Mar. 29, 1996

[51] Int. Cl.$^6$ .......................... G01G 13/16; G01G 13/02; G01G 19/02

[52] U.S. Cl. .......................... 177/116; 177/119; 177/145; 177/253; 177/262; 177/59; 177/133

[58] Field of Search .............................. 177/15, 116, 119, 177/132, 133, 145, 161, 162, 253, 262, 59, DIG. 9; 222/55, 58, 77

[56] References Cited

U.S. PATENT DOCUMENTS

| | | | |
|---|---|---|---|
| 2,496,548 | 2/1950 | La Rosa et al. | 222/55 |
| 3,454,170 | 7/1969 | Kleissle | 177/119 |
| 3,884,313 | 5/1975 | Engles | 177/119 |
| 3,897,868 | 8/1975 | Smith Jr. | 222/55 |
| 3,994,404 | 11/1976 | Kivosec | 177/119 |
| 4,257,518 | 3/1981 | Stock et al. | 222/55 |
| 4,348,852 | 9/1982 | Clancy | 222/55 |
| 4,465,211 | 8/1984 | Van der Lely et al. | 177/145 |
| 4,595,125 | 6/1986 | Alwerud | 222/55 |
| 4,729,442 | 3/1988 | Sichet | 177/50 |
| 4,945,957 | 8/1990 | Kardux et al. | 222/55 |
| 4,983,090 | 1/1991 | Lehmann et al. | 414/326 |
| 5,007,561 | 4/1991 | Wahl et al. | 222/55 |
| 5,044,819 | 9/1991 | Kilheffer et al. | 177/119 |
| 5,184,754 | 2/1993 | Hansen | 222/55 |
| 5,435,189 | 7/1995 | Gmuer et al. | 222/55 |
| 5,466,894 | 11/1995 | Naef | 222/55 |

Primary Examiner—Randy W. Gibson
Attorney, Agent, or Firm—Worrel & Worrel

[57] ABSTRACT

An apparatus for dispensing materials, the apparatus having a container for gravitationally receiving the materials in a collection position; a control mechanism for selective dispensing of the materials from the collection position; and a suspension assembly, operable to support the container in an operational position, and to measure the materials in the collection position before said selective dispensing by the control mechanism of the materials from the collection position.

12 Claims, 4 Drawing Sheets

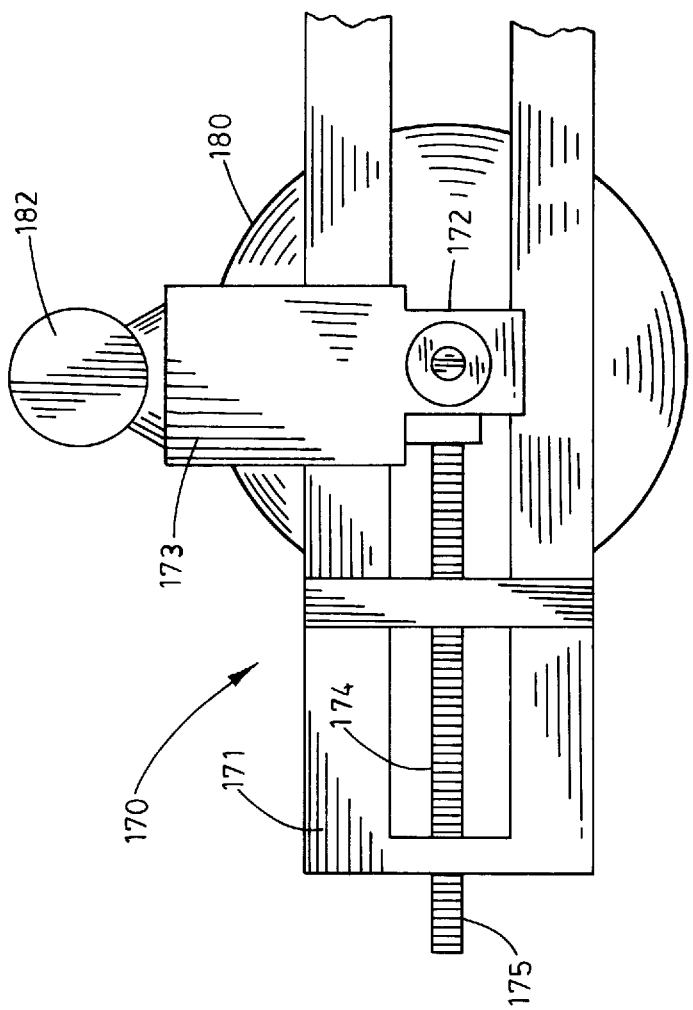

APPARATUS FOR DISPENSING MATERIALS

BACKGROUND OF THE INVENTION

1. Field of the Invention

The present invention relates to an apparatus for dispensing materials and, more particularly, to such an apparatus which is uniquely well suited to the dispensing of bulk materials in relatively small quantities to receiving vehicles of limited capacity.

2. Description of the Prior Art

The handling of bulk materials presents a host of difficulties which may not be readily apparent until the exigencies of a particular operative environment are experienced. For example, in the construction industry as well as in the case of those businesses supplying materials to the construction industry and to home owners, it is frequently the case that bulk materials must be dispensed in measured quantities and under such circumstances that the desired precision and convenience are lacking. Such bulk construction materials as sand, gravel and rock and soil amendments such as humus, fertilizer, bark and a wide variety of other materials must frequently be dispensed and transported in relatively small quantities. The volumes required are frequently too great to make individually containerized quantities of the products practical, but too small to make full commercial bulk deliveries practical.

In such circumstances, the quantity of a particular bulk material to be dispensed is typically measured by weight. Similarly, in the case of businesses selling such materials, the price charged for the materials is typically based upon the weight of the material. For example, the price for gravel may be set based upon a designated price per ton. In other instances, the price may be based upon the designated amount per volume such as, for example, a price based upon a designated price per cubic yard. In these instances, for a designated bulk material, there may be a known conversion so that it is known that a given weight of a designated material is equivalent to a designated volume of the material. Thus, in such circumstances, if the price or job requirements designate that a certain volume of material be dispensed, that volume of material can be dispensed based upon the weight of the material converting this measurement to the equivalent volume.

Nonetheless, in such quantities, the difficulties associated with weighing and dispensing of the bulk materials are considerable. Stated most simply, the designated amount of bulk material must be weighed or otherwise measured and then dispensed. In relatively small quantities, this can be achieved by hand, in effect, through the medium of shoveling the bulk material into a container resting on a suitable scale or other measuring device and subsequently depositing the measured material into a receiving vehicle or the like until the requested volume of bulk material has been dispensed. More commonly, however, personnel dispensing the material simply estimate when the requested amount has been dispensed. Frequently this practice results in a greater quantity of the designated bulk material being dispensed in order to avoid dispensing less than the designated amount. This practice suffers from a number of undesirable consequences including waste and inefficiency. Of perhaps more acute nature are the consequences resulting from dependency on the accuracy of the measured amount of material, particularly where the construction requirements are dependent for reliability upon using the precise quantity specified. Thus, for example, where the construction requirements designate that a given quantity of material be distributed over or within a given area, the inaccuracy of the preceding practice may, to varying degrees, render the completed construction project inadequate or compromise the structural integrity thereof.

While a variety of devices have been developed which have attempted to overcome the difficulties in the dispensing of such materials, they typically have been less than satisfactory in numerous respects. Certain of these devices have been capable of measuring relatively precisely the quantity of material to be dispensed. Typically, however, such devices are too expensive to be employed in wide usage as well as too cumbersome to permit convenient dispensing of the materials to, for example, vehicles of limited capacity. In other instances, such prior art devices may be appropriately inexpensive for practical application, but are of such limited capacity as to render them impractical in such operative environments. These deficiencies are merely representative of a myriad of operative deficiencies characterized by such prior art devices.

Therefore, it has long been known that it would be desirable to have an apparatus for dispensing materials which was capable accurately and dependably of measuring bulk materials in operative environments where relatively small quantities of such material are specified; which had particular utility in the dispensing of bulk materials to vehicles of limited capacity and into relatively confined areas; which could be manufactured and sold at a cost which was entirely acceptable within such industries and businesses in which such devices are required for use; which was capable of operation in the dispensing of a wide variety of materials including particularly bulk materials employed in construction, landscaping and the like; which was widely adaptable for dispensing such materials to a variety of types of receiving vehicles and receptacles; and which was otherwise entirely successful in achieving its operational objectives.

SUMMARY OF THE INVENTION

Therefore, it is an object of the present invention to provide an improved apparatus for dispensing bulk materials.

Another object is to provide such an apparatus which is particularly well suited to the dispensing of bulk materials in operative environments in which relatively small quantities of such materials are to be dispensed.

Another object is to provide such an apparatus which is capable accurately and dependably of measuring bulk materials in operative environments in which relatively small quantities of bulk materials must be measured and dispensed to vehicles of relatively small capacity and under such circumstances in which the exigencies of the marketplace customarily dictate less than accurate results.

Another object is to provide such an apparatus which can be manufactured and sold at a cost which is acceptable within such industries and businesses in which such devices are required for use.

Another object is to provide such an apparatus which is adapted for use in dispensing a wide variety of bulk materials in virtually any sequence and particularly those which are used in such environments as construction, landscaping and the like.

Another object is to provide such an apparatus which is particularly well suited to the dispensing of bulk materials to vehicles having storage areas of limited access such as, for example, in the case of a small pickup truck having a camper shell over the bed with access to the bed limited to a tail gate or the like.

Another object is to provide such an apparatus which is adapted for use in a wide variety of businesses in the dispensing of materials at a cost and with a dependability of use not heretofore achieved in the art.

Further objects and advantages are to provide improved elements and arrangements thereof in an apparatus for the purpose described which is dependable, economical, durable and fully effective in accomplishing its intended purposes.

These and other objects and advantages are achieved, in the preferred embodiment of the apparatus of the present invention, in an apparatus for dispensing materials having a container for gravitationally receiving the materials in a collection position; a control mechanism for selective dispensing of the materials from the collection position; and a suspension assembly supporting said container in an operational position and operable to measure the materials in the collection position before selective dispensing by the control mechanism of the materials from the collection position.

BRIEF DESCRIPTION OF THE DRAWINGS

FIG. 4 is a somewhat further enlarged, fragmentary side elevation of the driving assembly for the conveyor assembly of the apparatus of the present invention.

DESCRIPTION OF THE PREFERRED EMBODIMENT

Figure 1:
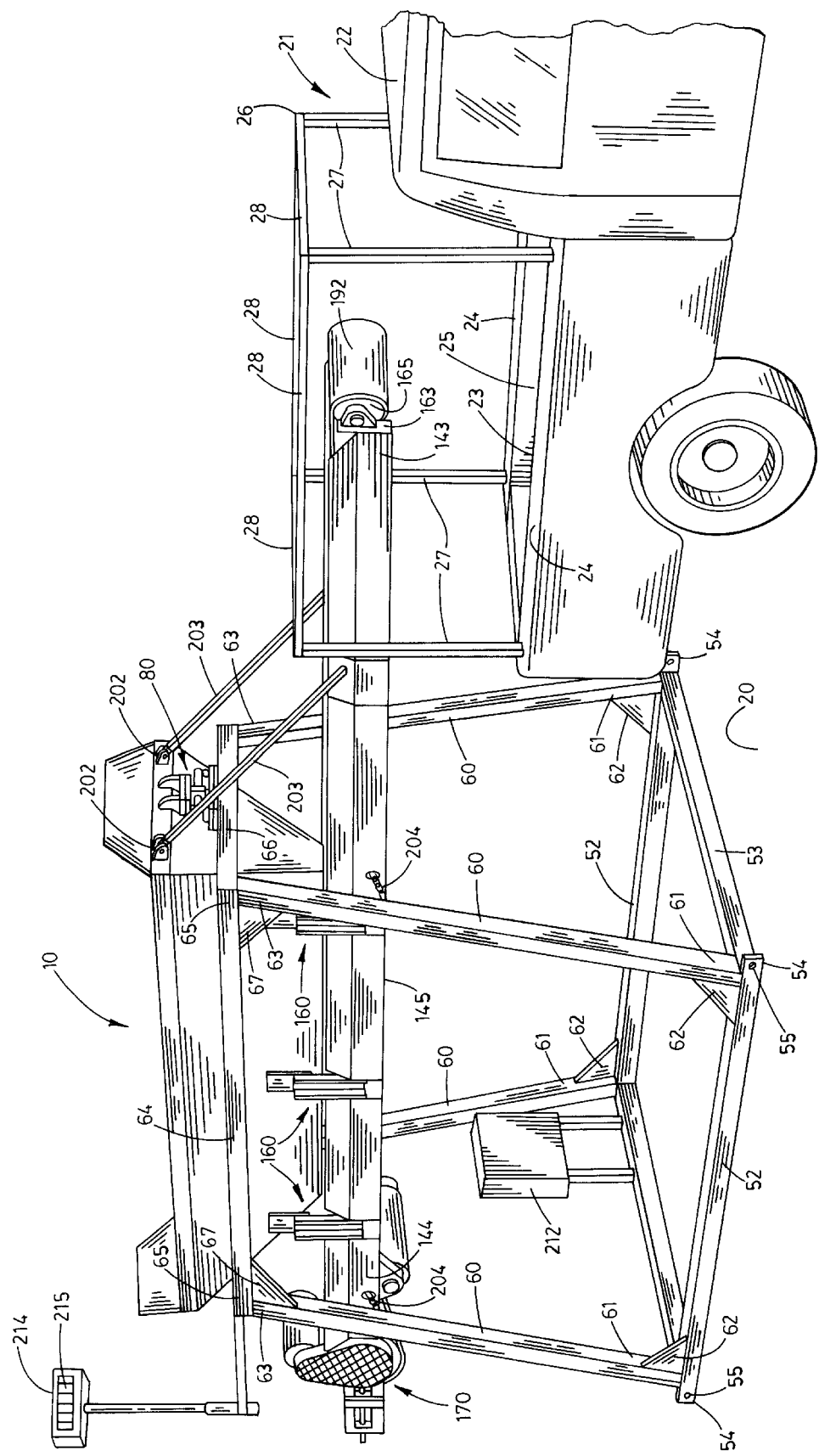
FIG. 1 is a fragmentary perspective view depicting the apparatus of the present invention in a typical operative environment dispensing materials to a vehicle of limited capacity.

Referring more particularly to the drawings, the apparatus of the present invention is generally indicated by the numeral 10 in FIG. 1. The apparatus is shown in a typical operative environment in FIG. 1 in which the earth'surface or surface of support is indicated by the numeral 20. A vehicle 21 is fragmentarily shown therein disposed in position for receiving bulk materials dispensed by the apparatus of the present invention, as will hereinafter be described in greater detail. The vehicle has a cab 22 with a bed 23 adapted to receive the bulk materials to be dispensed. The bed of the vehicle is bounded by side walls 24 defining a receiving compartment 25 for the vehicle. For illustrative convenience, a frame 26 is mounted on the side walls of the vehicle extending above the bed and thereby constituting an impediment to the dispensing of the bulk materials thereto. More particularly, the frame 26 has four vertical members 27 extending upwardly to terminal end portions which are interconnected by four horizontal members 28.

Figure 2:
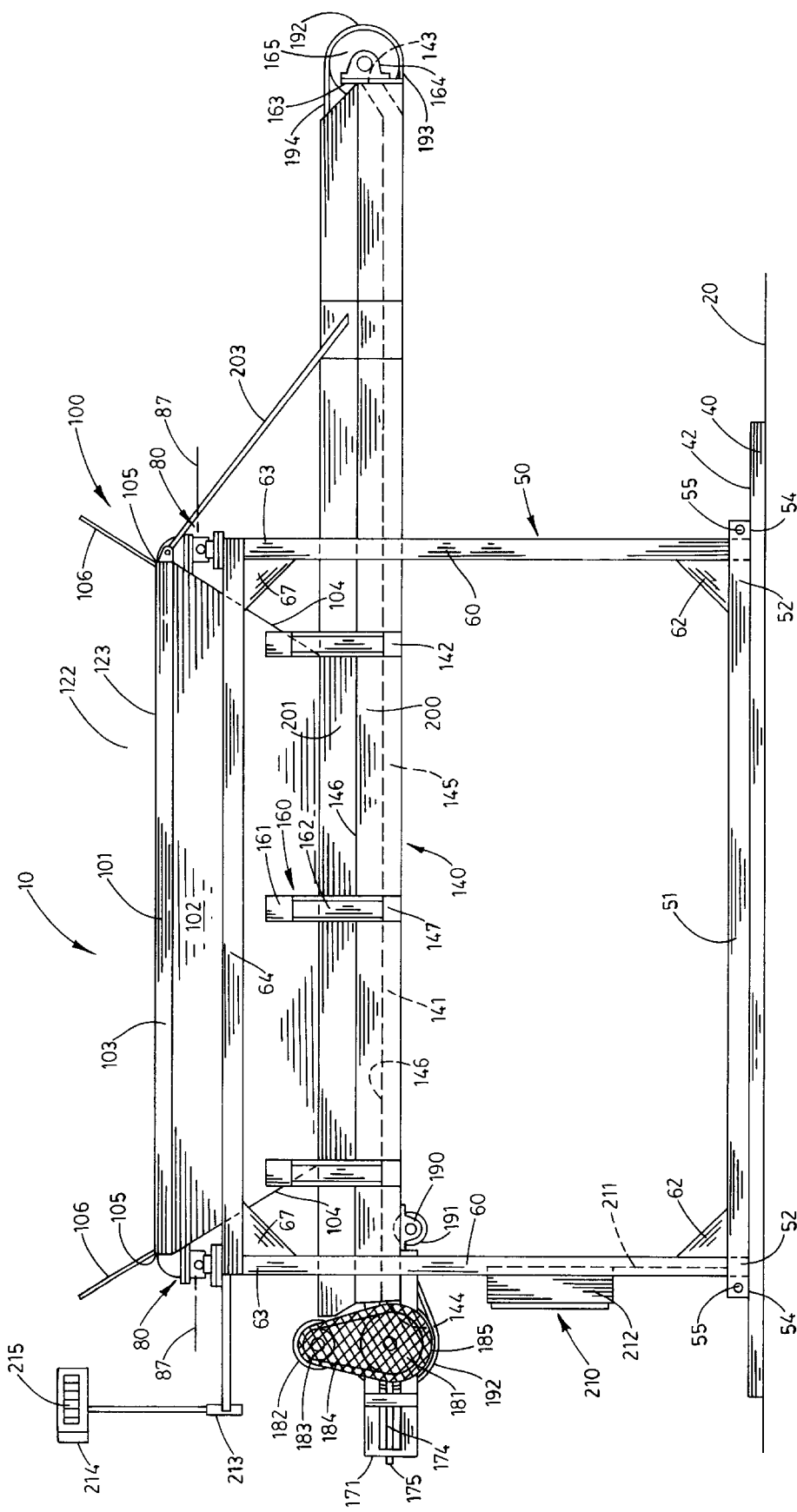
FIG. 2 is a side elevation of the apparatus of the present invention.

As shown best in FIG. 2, the apparatus 10 is mounted on a pad or foundation 40 which is preferably constructed of reinforced concrete. The foundation has a rectangular configuration with lateral edges 41 and a flat, horizontal upper surface 42.

The apparatus 10 has a main frame 50 preferably constructed of steel and mounted on the foundation 40 by any suitable means. More specifically, the main frame has a pair of lower longitudinal members 51 extending in parallel relation to each other. Each of the longitudinal members has opposite end portions 52. The corresponding opposite end portions of the longitudinal frame members are interconnected by lower transverse frame members 53 disposed in parallel relation to each other and in right angular relation to the longitudinal members. Extending endwardly from each of the opposite end portions 52 of each of the longitudinal members is a flat flange 54 having a hole 55 extending therethrough.

Four upright frame members 60 are individually mounted on and extend upwardly from the juncture of each longitudinal frame member 51 and its respective lower transverse frame member 54. The upright frame members extend upwardly at inwardly convergent angles relative to their respective transverse frame members and in substantially right angular relation to the longitudinal frame members. A brace plate 62 is weldably secured on each opposite end portion of each longitudinal frame member and its respective adjacent lower end portion 61 of its upright frame member and 60. The upright frame members extend to upper end portions 63. Corresponding upper end portions 63 are interconnected by upper longitudinal frame members 64 having opposite end portions 65 individually mounted on the upper end portions 63 of the upright frame member 60. Thus, the upper longitudinal frame members 64 are parallel to the lower longitudinal members 51. Corresponding upper end portions 63 of the upright frame members 60 are interconnected by upper transverse frame member 66. The opposite end portion of each upper longitudinal frame member and its adjacent upright member 60 is interconnected by a base plate 67.

A pair of load cell assemblies 80 are individually mounted on the upper surface of the upper transverse frame members 66 centrally located and in alignment longitudinally of the main frame 50. In the preferred embodiment of the invention, the load cell assemblies are those sold by Rice Lake Weighing Systems of Rice Lake, Wis. under the product designation "easy mount tank weighing assembly" and having the designation "Model RL 70,000-B-5K Load Cell." As shown best in FIG. 3, each of the load cell assemblies has a mount 81 affixed by any suitable means on its respective upper transverse frame member 66. A pair of securing assemblies 82 are mounted on the mount 81 in spaced relation to each other and, in turn, mount a load cell or strain gauge 83 extending therebetween in spaced relation to and between the securing assemblies to the mount 81. A mounting block 84 is borne by and extends about the strain gauge 83. A mount 85 is pivotally secured on the mounting block 84 by a pivot pin 86. The pivot pins 86 of the respective load cell assemblies define a pivot axis 87 which extends longitudinally of the main frame 50.

A dispensing assembly generally indicated by the numeral 100 is mounted on and extends between the load cell assemblies 80, as best shown in FIG. 2. The dispensing assembly includes a hopper assembly 101 having downwardly convergent, longitudinal side walls 102 individually having vertically extending upper lips 103. The longitudinal side walls are interconnected at corresponding opposite ends thereof by downwardly convergent transverse end walls 104. The transverse end walls have upper lips 105 interconnecting the upper lips 103. Upwardly divergent upper end walls 106 individually extend from the upper lips 105 of the transverse end walls 104.

Figure 3:
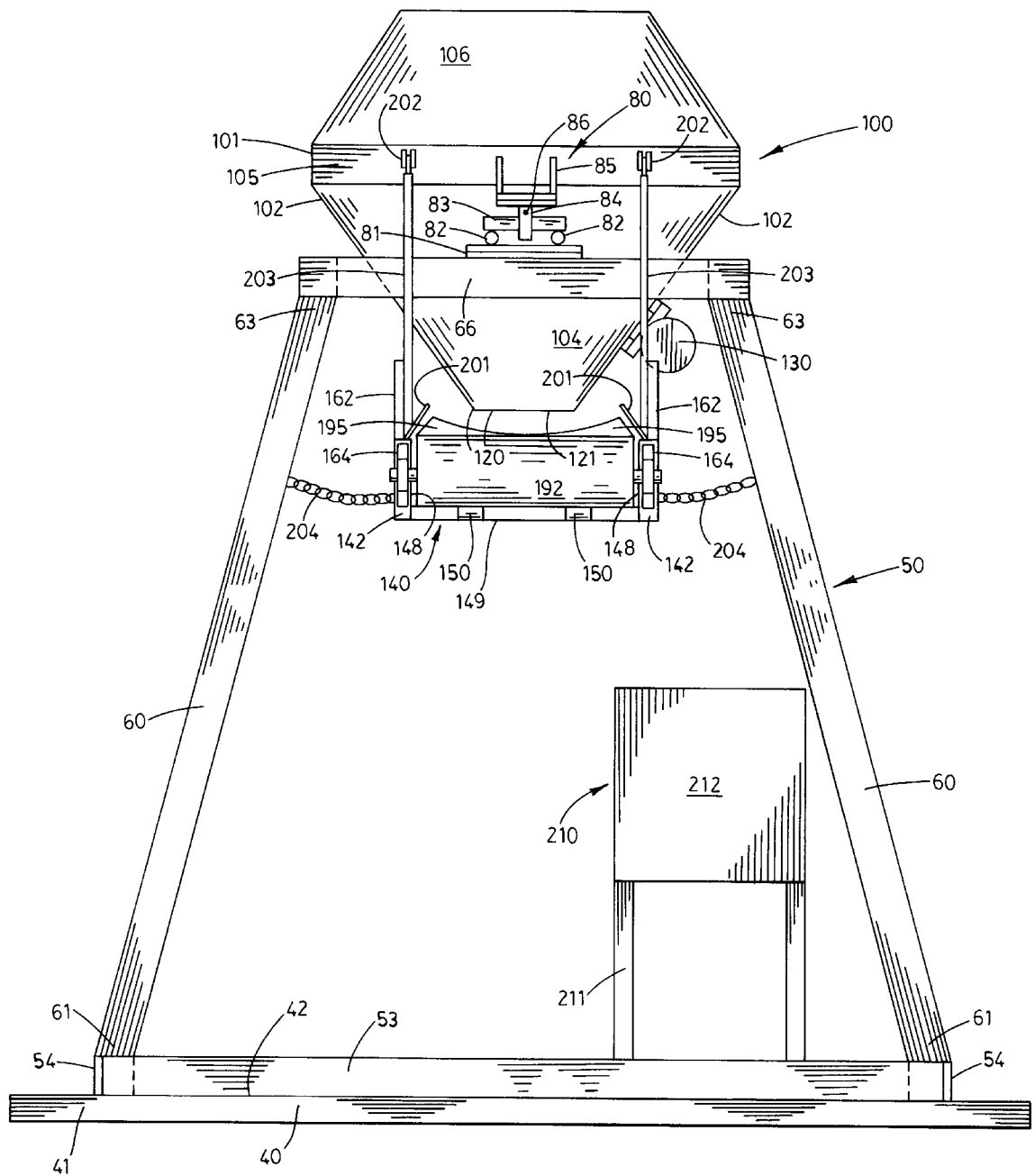
FIG. 3 is a somewhat enlarged front elevation of the apparatus of the present invention.

The side walls 102 and end walls 104 terminate at lower edges 120 defining a horizontal plane and bounding a rectangular discharge opening 121. The hopper assembly can be viewed as having a mouth 122 of a generally rectangular configuration leading to an internal chamber 123. The hopper assembly has a "live bottom" meaning that it does not itself have a closure for the rectangular discharge opening. As shown in FIG. 3, a vibrating assembly 130 is mounted on the side wall 102 of the hopper assembly 101 on the right as viewed in FIG. 3. The vibrating assembly can be of any suitable type driven by electrical or pneumatic power.

A conveyor assembly 140 is mounted on the hopper assembly 101. The conveyor assembly has a conveyor frame 141 having a pair of longitudinal conveyor frame members 142 which extend from front end portions 143 on the right, as viewed in FIG. 2, to rear end portions 144 on the left, as viewed in FIG. 2. The pair of longitudinal conveyor frame members are disposed in spaced, substantially parallel relation to each other and have lower edges 145 and upper edges 146. Each of the longitudinal conveyor frame members has an outer surface 147 and an opposite inner surface 148. The longitudinal conveyor frame members are interconnected by a plurality of transverse frame members 149 extending therebetween in spaced substantially parallel relation to each other and in right angular relation to longitudinal conveyor frame members. The transverse frame members 149 mount a pair of longitudinally extending slide members 150 having upper surfaces bearing laminations of ultra high molecular weight plastic having a low coefficient of friction for purposes subsequently described.

Six conveyor mounting assemblies 160 are employed to mount the conveyor assembly 140 on the hopper assembly 101. Each of the conveyor mounting assemblies includes a hopper mounting plate 161 mounted by any suitable means on the side wall 102 of the hopper assembly 101. As shown in FIG. 2, three such hopper mounting plates 161 are mounted in spaced relation to each other on each of the side walls 102. A conveyor mounting plate 162 is mounted on and interconnects each of the hopper mounting plates 161 and one of the longitudinal conveyor frame members 142 of the conveyor mounting assemblies 140. The conveyor assembly is thus mounted by the conveyor mounting assemblies 160, as best shown in FIG. 2, extending horizontally through the main frame 50 between the upright frame members 60, in vertical alignment with the discharge opening 121 and extending laterally of the main frame a substantial distance to the right, as shown in FIG. 2. The front end portions 143 of the longitudinal conveyor frame members 142 individually mount front bearing mounting plates 163 in vertical relation. The front bearing mounting plates, in turn, individually mount front bearings 164 defining an axis of rotation right angularly related to the pivot axis 87 and the longitudinal conveyor frame members 142. A front roller assembly 165 is journaled in the front bearings for rotation about the axis of rotation defined therby.

A conveyor drive assembly 170 is mounted on the rear end portions 144 of the longitudinal conveyor frame members. The conveyor drive assembly has a pair of mounting frames 171 individually mounted on the rear end portions 144 of the longitudinal conveyor frame members 142 and extending to the left, as viewed in FIG. 2. The mounting frames are disposed in spaced, substantially parallel relation to each other. A pair of bearing blocks 172 are individually received in the mounting frames for slidable movement therewithin. The bearing blocks are rigidly interconnected by a bearing block frame 173 extending upwardly from each bearing block and horizontally therebetween so that the bearing blocks are movable as a unit in the bearing block frames. The bearing blocks define an axis of rotation which is right angularly related to the longitudinal conveyor frame members 142. Screw threaded adjustment shafts 174 are individually screw threadably mounted on the mounting frames 171 and individually connected to their respective bearing blocks 172. The adjustment shafts have rearwardly extending sockets 175 adapted to receive a socket wrench or power tool for purposes of turning the adjustment shafts. The adjustment shafts when rotated are operable to move the bearing blocks 172 along the mounting frames along a horizontal path defined by the frames.

A drive roller assembly 180 is journaled in the bearing blocks 172 for rotation about the axis of rotation defined therby. A drive sprocket 181 is mounted on the drive roller assembly in axial alignment therewith. An electric drive motor assembly 182 is mounted on the bearing block frame 173 above the drive roller assembly and, in turn, mounts a drive sprocket 183 in vertical alignment with the drive sprocket 181 of the drive roller assembly. A drive chain 184 is entrained about and interconnects the drive sprockets 181 and 183. Accordingly, it will be seen that the electric drive motor assembly is operable to rotate the drive roller assembly 180 about its axis of rotation. It will also be seen that adjustment of the position of the drive roller assembly by operation of the screw threaded adjustment shafts 174 moves the electric drive motor assembly 182 therewith without having to disconnect or reconnect any portion thereof. A safety cage 185 is mounted on and extends about the sprockets 181 and 183 and the drive chain 184 interconnecting the drive sprockets.

A pair of bearings 190 are individually mounted on the lower edges 145 of the longitudinal conveyor frame members 142 in adjacent spaced relation to the drive roller assembly 180 and defining an axis of rotation parallel to the axis of rotation of the bearing blocks 172. A lower roller assembly 191 is journaled in the bearings 190 for rotation about the axis of rotation thereof. A conveyor belt 192 is entrained about the front roller assembly 165 and the drive roller assembly 180. The conveyor belt has a lower run 193 which extends over the lower roller assembly 191 and rides on top of the slide members 150 of the conveyor assembly 140 and the ultra high molecular weight plastic surfaces thereof. The conveyor belt has an upper run 194 which extends over a plurality of supporting rollers, not shown, between the front roller assembly 165 and drive roller assembly 180. It will be understood that the electric drive motor assembly 182 rotates the drive roller assembly 180 in a clockwise direction, as viewed in FIG. 2, to carry the upper run of the conveyor belt from left to right, as viewed in FIG. 2. The upper run 194 of the conveyor belt has raised lateral edges or portions 195 extending substantially the entire length thereof, as shown in FIG. 3. The raised lateral portions of the conveyor belt are held in this attitude by a plurality of angled smaller rollers, not shown. As best shown in FIG. 3, there is limited clearance between the lower edges 120 of the hopper assembly 101 and the upper run of the conveyor belt. The reason for this will subsequently be discussed.

The conveyor frame 141 is enclosed laterally thereof in a pair of side housings 200 individually mounted on the longitudinal conveyor frame members 142. The side housing shave upwardly convergent portions 201. A pair of pivotal support linkages 202 are individually mounted on the upper lip 105 of the transverse end wall 104 of the hopper assembly 101 on the right, as viewed in FIG. 2. The pivotal support linkages individually mount support arms 203 which extend obliquely downwardly to terminal ends which are individually mounted on the longitudinal conveyor frame members 142. Chains 204 individually interconnect each upright frame member 60 and the adjacent longitudinal conveyor frame member 142 to permit limited lateral movement of the conveyor assembly 140, but to resist greater lateral movement.

The apparatus 10 has a control system or station generally indicated by the numeral 210. The control station has a support frame 211 mounted on the main frame 50 on the left, as viewed in FIG. 2. A control box 212 is mounted on the support frame and contains suitable controls and electrical pneumatic circuits for operation of the apparatus. An upper support arm 213 is mounted on and extended rearwardly from the upper transverse frame member 66 on the left, as viewed in FIG. 2. At the upwardly extending end of the upper support arm is a display housing 214 operable to provide a digital display 215, as will hereinafter be discussed in greater detail.

OPERATION

The operation of the described embodiment of the subject invention is believed to be clearly apparent and is briefly summarized at this point.

The apparatus 10 can readily be employed at a construction site or in a business which sells bulk materials such as, for example, a building supply business, lumberyard or the like. In the illustrative example, the vehicle 21 is backed into the position shown in FIG. 1 to receive the bulk materials to be dispensed. As can be visualized in FIG. 1, the narrow vertical and transverse dimensions of the conveyor assembly 140 permit it to be extended into confined areas such as shown for illustrative convenience relative to the frame 26 over the receiving compartment 25 of the vehicle. Thus, the conveyor assembly is readily extended into the confined area bounded by the vertical members 27 and horizontal members 28 of the frame. Accordingly, the vehicle 21 is shown in FIG. 1 in position to receive bulk materials dispensed by the apparatus 10.

Where a given quantity of bulk material has been designated or requested for dispensing, the bulk material is deposited in the chamber 123 of the hopper assembly 101 through the mouth 122 thereof. This can be done by any suitable means. For example, a tractor having a scoop can be employed to deposit the bulk materials, such as gravel, in the chamber 123. Since the discharge opening 121 of the hopper assembly is unobstructed, the bulk material falls gravitationally onto the upper run 194 of the conveyor belt 192 of the conveyor assembly 140. At this time, preferably the conveyor assembly is not operated so that the upper run of the conveyor belt is stationary. Due to the limited clearance between the lower edges 120 of the hopper assembly and the upper run of the conveyor belt, the bulk material collects within the chamber of the hopper assembly as it is deposited therein and does not flow laterally along the upper run of the conveyor belt.

Precise measurement of the quantity of bulk material within the chamber 123 of the hopper assembly 101 is achieved using the control system 210. The load cell assemblies 80 operate to register all of the weight supported thereon. This, as noted, includes not only the hopper assembly and the bulk materials contained therein but also the conveyor assembly 140. The control system operates to deduct the known weight of these portions of the structure of the apparatus from the total weight registered thereby to determine the weight of the bulk materials within the hopper assembly. This weight is registered for visual observation both by the operator and the customer in the digital display 215 of the display housing 214.

During the weighing procedure as well as during actual dispensing of the bulk material, the hopper assembly 101, conveyor assembly 140 and all of the structure supported on the load assemblies 80 is capable of pivoting to a limited degree about the pivot axis 87 as controlled by the chains 204. This permits the hopper assembly and conveyor assembly to adjust to the weight of the material deposited in the hopper assembly as well as to permit a more accurate reading of the weight of the bulk material by permitting the load cell assemblies to operate most effectively.

When the desired weight of bulk material has been deposited in the hopper assembly 101, the conveyor drive assembly 170 is operated from the control station 210 to carry the upper run 194 of the conveyor belt 192 from left to right, as viewed in FIGS. 1 and 2. That portion of the bulk material actually resting directly on the upper run beneath the lower edges 120 of the hopper assembly 101 is carried along the conveyor assembly by the upper run of the conveyor belt thus carrying it from beneath the hopper assembly. This permits the bulk material to be continually gravitationally fed downwardly onto the conveyor belt as the bulk material is carried from therebeneath. As a consequence, the bulk material is released into the receiving compartment 25 of the vehicle 21 on a gradual basis thereby avoiding strain to the vehicles, damage to the vehicle 21 on a gradual basis walls 24. When all of the bulk materials have been so disposed, the operator of the vehicle simply drives away from the apparatus following the forwardly extending end portion of the conveyor assembly 140.

The vibrating assembly 130 can be operated by the control system 210 to shake the hopper assembly 101 during loading of the hopper assembly as well as during actual dispensing of the bulk materials by the conveyor assembly 140 as may be desired. The conveyor drive assembly 170 can be adjusted in the mounting frames 171 as desired to control the tension of the conveyor belt 192 simply by adjusting the screw threaded adjustment shafts 174, as previously described.

Therefore, the apparatus for dispensing materials of the present invention is capable accurately and dependably of measuring bulk materials in operative environments where relatively small quantities of such material are specified; has particular utility in the dispensing of bulk materials to vehicles of limited capacity and into relatively confined areas; can be manufactured and sold at a cost which is entirely acceptable within such industries and businesses in which such devices are required for use; is capable of operation in the dispensing of a wide variety of materials including particularly bulk materials employed in construction, landscaping and the like; is adapted to dispense such materials to a variety of types of receiving vehicles and receptacles; and is otherwise entirely successful in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for dispensing materials, the apparatus comprising a container for gravitationally receiving said materials in a collection position; a conveyor assembly mounted on said container beneath said collection position for selective dispensing of the materials from said collection position; and means supporting said container in an operational position and including a pair of support mechanisms solely mounting said container in said operational position for substantially pivotal movement relative to a longitudinal axis with the conveyor assembly therebeneath and operable to measure said materials in said collection position before said selective dispensing by the conveyor assembly of the materials from the collection position.

2. The apparatus of claim 1 wherein said support mechanisms are load cells.

3. The apparatus of claim 2 wherein said load cells collectively detect the total weight mounted on and suspended therefrom and the apparatus includes a measuring system operably connected to the load cells and operable to deduct the weight mounted on and suspended therefrom, other than the materials received in the collection position, from said total weight to determine the weight of the materials received in said collection position, and to register said weight of the materials received in the collection position in indicia understandable by human observation.

4. The apparatus of claim 3 wherein said measuring system is operable to display said indicia for said human observation.

5. The apparatus of claim 2 wherein said conveyor assembly is mounted on the container beneath said collection position for substantially pivotal movement with the container about a pivot axis substantially parallel to said longitudinal axis with the conveyor assembly disposed in spaced, substantially parallel relation to said pivot axis for receiving said materials from said collection position for transport to a dispensing position.

6. The apparatus of claim 5 wherein said supporting means further includes a main frame on which said load cells are mounted and wherein said conveyor assembly has first and second opposite end portions defining a length greater than the corresponding length of said main frame and the container mounted thereon in said operational position and wherein the conveyor assembly is mounted on the container extending beneath and in adjacent spaced relation to substantially the entire length of the collection position of the container with the second of said opposite end portions of the conveyor assembly extending to said dispensing position which is remote from said main frame for dispensing said materials therefrom.

7. An apparatus for dispensing materials, the apparatus comprising a container for gravitationally receiving said materials in a collection position; means supporting said container in an operational position including a main frame mounting support mechanisms on which said container is mounted in said operational position, said support mechanisms mounted on the main frame in spaced relation to each other defining a longitudinal axis and the container mounted on and suspended from said support mechanisms extending therebetween substantially along said longitudinal axis and wherein said container is mounted on the support mechanisms for substantially pivotal movement about a pivot axis substantially parallel to said longitudinally axis and said support mechanisms are load cells operable to measure the weight of the materials in said collection position; and control means for selective dispensing of the materials from said collection position including a conveyor assembly mounted on said container beneath said collection position for substantially pivotal movement with the container about said pivot axis with the conveyor assembly disposed in spaced, substantially parallel relation to said pivot axis for receiving said materials from said collection position for transport to a dispensing position and wherein said conveyor assembly has first and second opposite end portions defining a length greater than the corresponding length of said main frame and the container mounted thereon in said operational position and wherein the conveyor assembly is mounted on the container extending beneath and in adjacent spaced relation to substantially the entire length of the collection position of the container with the second of said opposite end portions of the conveyor assembly extending to said dispensing position which is remote from said main frame for dispensing said materials therefrom and wherein the conveyor assembly has a conveyor belt entrained therein having an upper run movable along a path extending substantially the entire length of the collection position and to said dispensing position and wherein the first opposite end portion of the conveyor assembly is remote from said second opposite end portion and mounts a drive assembly connected in driving relation to said conveyor belt and is operable to transport the upper run of the conveyor belt along said path whereby said load cells are operable to measure the materials in the collection position before said selective dispensing by the control means from the collection position.

8. The apparatus of claim 7 wherein said conveyor belt is entrained in the conveyor assembly about a pair of rollers and wherein said drive assembly mounts one of said rollers on an adjustment frame mounted on the first opposite end portion of the conveyor assembly and adapted to be secured in a selected position on the adjustment frame to impart the desired tension to the conveyor belt entrained about said rollers.

9. The apparatus of claim 8 wherein said roller mounted on the adjustment frame is mounted on said adjustment frame in a subframe selectively positionable on the adjustment frame to impart said tension to the conveyor belt.

10. The apparatus of claim 9 wherein said drive assembly includes a drive motor mounted on said subframe, selectively positionable on the adjustment frame, and connected in driving relation to the roller mounted in the subframe.

11. The apparatus of claim 10 wherein said conveyor belt has a lower run and the conveyor assembly has a member extending beneath said lower run having a surface along which said lower run is moved which has a low coefficient of friction.

12. The apparatus of claim 11 wherein the portion of the conveyor assembly extending from the main frame to the dispensing position is transversely dimensioned so as to permit the conveyor assembly to extend into confined areas for discharge of said materials from the dispensing position.

* * * * *

UNITED STATES PATENT AND TRADEMARK OFFICE
CERTIFICATE OF CORRECTION

PATENT NO. : 5,880,407
DATED : March 9, 1999
INVENTOR(S) : JOHN D. FLAMMANG

It is certified that error appears in the above-identified patent and that said Letters Patent is hereby corrected as shown below:

Column 5, line 33, delete "assemblies" and substitute

---assembly---

Column 6, line 7, delete "therby" and substitute

---thereby---

Column 6, lines 53 & 54, delete "housing shave" and substitute

---housings have---

Column 8, lines 19 & 20, delete "vehicles, damage to the vehicle 21 on a gradual basis walls 24." and substitute ---vehicle, damage to the bed 23 thereof or to the side walls 24.---

Column 8, line 21, delete "disposed," and substitute

---dispensed,---

UNITED STATES PATENT AND TRADEMARK OFFICE
CERTIFICATE OF CORRECTION

PATENT NO. : 5,880,407
DATED     : March 9, 1999
INVENTOR(S): John D. Flammang

It is certified that error appears in the above-identified patent and that said Letters Patent is hereby corrected as shown below:

Column 9, line 49, delete "longitudinally" and substitute

---longitudinal---

Signed and Sealed this

Tenth Day of August, 1999

Attest:

Attesting Officer

Q. TODD DICKINSON

Acting Commissioner of Patents and Trademarks